United States Patent [19]
Hause

[11] 3,799,004
[45] Mar. 26, 1974

[54] CHANGE SPEED POWER TRANSMISSION

[75] Inventor: Gilbert K. Hause, Bloomfield Hills, Mich.

[73] Assignee: General Motors Corporation, Detroit, Mich.

[22] Filed: June 26, 1972

[21] Appl. No.: 266,057

[52] U.S. Cl. .................................. 74/763, 74/753
[51] Int. Cl. ........................ F16h 57/10, F16h 3/44
[58] Field of Search ................... 74/753, 759, 763; 192/87.11, 87.13

[56] References Cited
UNITED STATES PATENTS

| | | | |
|---|---|---|---|
| 2,395,459 | 2/1946 | Carnagua | 74/761 X |
| 2,546,378 | 3/1951 | Winther | 74/761 X |
| 2,764,904 | 10/1956 | Kummich | 74/763 |
| 2,961,896 | 11/1960 | DeLorean | 74/761 X |
| 3,386,314 | 6/1968 | Stockton | 74/761 X |
| 3,483,771 | 12/1969 | Forster et al. | 74/763 X |
| 3,509,784 | 5/1970 | Mahoney | 74/759 X |
| 3,640,153 | 2/1972 | Kepner | 74/759 |

FOREIGN PATENTS OR APPLICATIONS
848,698  8/1970  Canada ................... 74/759

*Primary Examiner*—Allan D. Herrmann
*Assistant Examiner*—P. S. Lall
*Attorney, Agent, or Firm*—Charles R. White

[57] ABSTRACT

Change speed transmission having separate clutches selectively applied by hydraulically operated nested pistons disposed within a rotatable drum that can be braked to provide reaction for transmission planetary gearing. A one way brake engages to directly connect a reaction member of the gearing to the braked drum for low range operation. By applying a first one of the clutches there is a shift off of the one way brake to establish an intermediate range. Both clutches are applied as the drum is released for rotation in direct drive.

4 Claims, 1 Drawing Figure

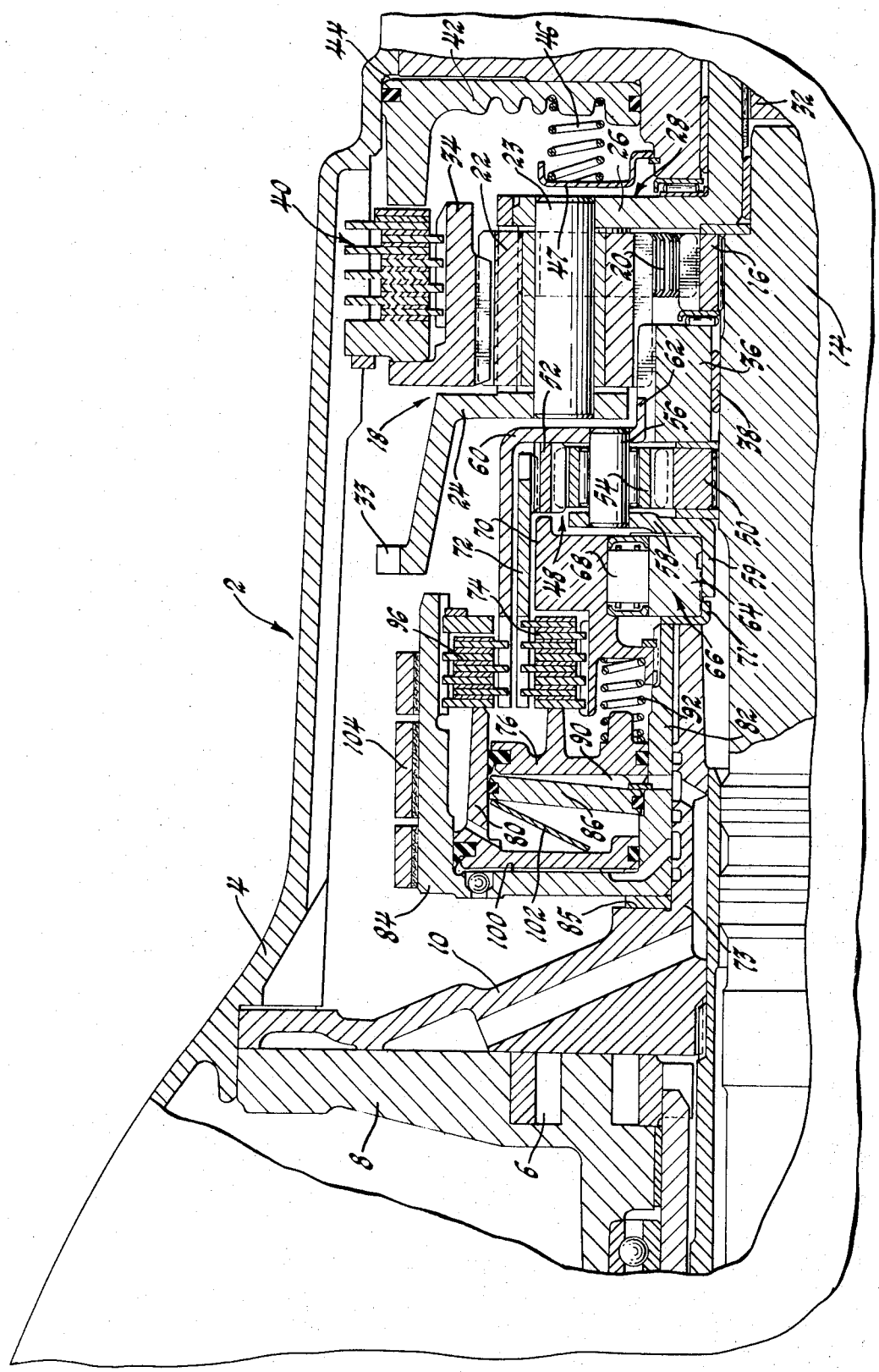

CHANGE SPEED POWER TRANSMISSION

This invention relates to change speed power transmissions and more particularly to a new and improved transmission having a selectively rotatable clutch package with one-way brake construction for controlling change speed gearing.

In vehicle power transmissions it is often advantageous to provide a highly compact clutch package for controlling transmission gearing to change transmission speed ratios. For example in my co-pending application Ser. No. 513,638, filed Nov. 12, 1965, for Three-Speed Transmissions and Controls there is a unitized rotatable clutch package comprising a drum-like housing with nested pistons which selectively actuate a pair of multi-plate friction clutches to condition the planetary gearing for a change-speed operation in a clutch-to-clutch shift transition. While my prior transmission has provided many important advantages, including the overall shortening of the transmission with the rotating clutch package and high quality smooth shifting with the clutch-to-clutch shift feature, fairly complex hydraulic controls are needed to time the shifts and ideally make them imperceptible to the average vehicle operator.

In the present transmission I have employed a rotating drum, nested pistons and a pair of multi-plate clutches as in my prior transmission. The clutch package construction and operation has been changed to eliminate the prior clutch-to-clutch shifting so that the hydraulic controls may be simplified. In the preferred embodiment of the present invention this has been accomplished by having an automatic upshift off of new one-way brake construction. More specifically, the one-way brake that I employ forms part of the clutch package and automatically holds a reaction member of a planetary gear set when the drum is braked without engagement of either of the clutches to condition the gearing for a low-speed drive. When one of the clutches is applied by one of the nested pistons there is an automatic and perfectly timed upshift off of the one-way brake for intermediate drive. Both multi-plate clutches are applied and the drum is released for direct drive operation. For engine braking, one of the clutches may be applied to connect the reaction member of the gear set to the drum which is again held from rotation by suitable braking means so that there is a back drive from the road wheels to the engine. In addition to the forward change speed ratios this transmission provides for a torque multiplying reverse drive.

It is an object, feature and advantage of this invention to provide a new and improved compact clutch package disposed adjacent to the vehicle change speed gearing which employs one-way brake means directly between transmission gearing and a braked drum having selectively engageable change speed clutches therein to automatically provide reaction for a predetermined drive range and to provide a shift off of this one-way brake means when one of the clutches is applied.

Another feature, object and advantage of this invention is to provide a new and improved clutch package for transmission gearing incorporating nested pistons that actuate inner and outer clutches operatively disposed within a rotatable drum adapted to be held from rotation by braking means and incorporating one-way brake means that locks to automatically condition the gearing for a predetermined forward-drive speed ratio and that automatically overruns when the inner clutch is applied or when both the inner and outer clutches are applied for establishing other forward-drive speed ratios.

Another feature, object and advantage of this invention is to provide a new and improved transmission having a compact clutch package that: (1) features one-way brake construction that locks to automatically condition the transmission gearing for low speed drive; and that overruns providing a shift off of the one-way brake for intermediate speed drive when one of the clutches is applied, and (2) that provides new and improved engine braking with the back drive from the road wheels to the engine when one of the clutch means is engaged to condition the transmission gearing for a speed reducing gear ratio.

These and other features, objects and advantages of this invention will become more apparent from the following detailed description and drawing in which:

The FIGURE is a side view partially in section, of the upper portion of a change speed automatic transmission.

Referring now to the FIGURE, the transmission 2 has a case 4 in which there is a hydrodynamic fluid torque converter or coupling, not shown, that is drivingly connected to a gear pump 6 disposed in pump body 8 closed by pump cover 10. The torque converter has a mechanically driven output that is drivingly connected to a centrally located torque transmitting shaft 14. This shaft terminates within the case 4 and is splined to the small sun gear 16 of a rear planetary gear set 18. This sun gear meshes with short planet gears 20 that in turn mesh with long planet gears 22. The long and short planet gears are rotatably mounted on spindles such as spindle 23 disposed between the front and rear plates 24 and 26 forming a carrier assembly 28. The carrier has a rearwardly extending hub that is splined to an output shaft 32 aligned with the power transmitting shaft 14. The front plate 24 of this carrier assembly has an annular arrangement of teeth 33 which can be engaged by a manually operated parking pawl, not shown, so that the transmission output can be locked for vehicle parking purposes.

In addition to meshing with the short planets 20 the long planet gears 22 mesh with a ring gear 34 and with a sun gear 36 that is rotatably mounted on the shaft 14 by a sleeve bearing 38. Disposed outwardly of the ring gear 34 is a multi-plate friction brake 40 having lined plates splined to the outer periphery of the ring gear 34 which are interleaved with steel plates splined to the interior of the transmission case 4. This multi-plate brake forms a reverse friction drive establishing device that is engaged to hold ring gear 34 stationary in response to the forward movement of hydraulically actuated piston 42 when there is a supply of operating pressure oil to chamber 44 from the controls such as discloses in my above-identified co-pending application. Coil springs 46 are mounted on a fixed retainer 47 disposed in the transmission case and contact the piston 42 for moving the piston to a retracted or disengaged position when the chamber 44 is exhausted.

Disposed in the transmission case 4 forwardly of the rear gear unit 18 is a simple planetary gear set 48 having a sun gear 50 splined to power transmitting shaft 14. This planetary gear set has a ring gear 52 and planet gear 54 which mesh with the sun and the ring gears. The planet gears are supported on spindles 56 that extend between the spaced inner and outer parts 58 and 60 which form a carrier assembly of the planetary gear set. As shown, the outer plate of this carrier assembly is drum-like in formation and terminates in an annular shoulder like portion having tangs 62 that extend between the teeth of the sun gear 36 of the rear planetary gear set to drivingly connect the carrier assembly of the front gear set to sun gear 36.

The inner part 58 of this carrier assembly has a longitudinally extending and annular hub 58 that is drivingly secured to the inner race 64 of the one-way brake 66 that has rollers 68 operatively disposed between the inner race 64 and an outer race 70. An annular spacer 71 is provided between the inner race 64 and a central cylindrical sleeve 73 extending rearwardly from the pump cover. Operatively disposed between the outer race 70 and an annular drum 72 splined to ring gear 52 is a multi-plate friction clutch 74 having lined plates splined to the drum 72 interleaved with steel plates splined to a shoulder portion of the outer race 70. This clutch is engaged by hydraulically actuated piston 76 which is nested inside of an outer piston 80 with both pistons being seated on an inner annular sleeve 82 of a drum-like clutch housing 84. This housing or drum 84 is disposed between a shoulder 85 of the pump cover and spacer 71 and is rotatably mounted on sleeve 73. Also fixed within the piston 80 is an annular divider member 86 that cooperates with the nested pistons 76 and 80 to form a control chamber 90 hydraulically connected to control so that a pressure oil fed thereto can effect the longitudinal movement of the piston 76 for the engagement of clutch 74. Return springs 92 operatively disposed between the piston 76 and the outer race of the one-way brake move the pistons to a retracted position when the pressure in the chamber 90 is released.

The outer piston 80 is mounted for longitudinal movement in drum 84 for engaging an outer multi-plate clutch 96 which has steel plates splined to the interior of the drum and friction plates splined to the outer drum portion of the carrier assembly of the simple planetary gear set. The outer piston 80 is moved longitudinally into engagement with the clutch 96 on the supply of apply oil to the chamber 100 formed between the drum and the vertical end walls of piston 80. A belleville type return spring 102 seated on the fixed divider 86 is employed to move the piston to a retracted position when the apply pressure is exhausted from chamber 100. The outer annular periphery of the clutch housing drum 34 is selectively engaged by a brake band 104 operated by suitable servomotor such as disclosed in my co-pending application referenced above.

For first or low range, the brake band 104 is applied to hold the drum 84 stationary so that the one-way brake 66 automatically engages in response to the forward rotation of the small sun gear 16 by the power transmitting shaft 14 to hold the large sun gear 36 for reaction. Under these conditions the rear planetary gear set 18 provides for a large input/output speed reducing ratio, 2.48 for example, with the carrier assembly 28 driven forwardly at a substantially lower speed than drive shaft 14.

For second or intermediate range the interior clutch 74 is engaged in response to the supply of operating fluid into the pressure chamber 90 causing the axial, clutch-engaging movement of piston 76. With clutch 74 engaged the ring gear 52 of the front gear set 48 is connected by the outer race 70 to the drum 84 which is still held from rotation by the brake band 104. With ring gear 52 of the front gear set held for reaction the front gear set is conditioned for a speed reducing ratio with carrier assembly of the front gear set 48 providing an output to drive the large sun gear 46 of the rear gear set forwardly at a reduced speed. With the large sun gear 36 so driven and with the small sun gear 16 driven at the speed of the torque converter turbine the rear gear set will provide an intermediate speed ratio, 1.62 for example, and an intermediate reduction drive. The one-way brake automatically free wheels on the apply of the clutch 74 to produce the intermediate drive so no special controls are needed to assure the timed release of the sun gear 36 for intermediate range drive. With this automatic free-wheeling, the one-to-two shift will be properly timed with merely the engagement of clutch 74 for smooth shifting operation.

For a direct drive the brake band 104 is released so that the drum is capable of rotating and the outer clutch 96 is engaged along with the inner clutch 74. Under these conditions the gear sets are locked for rotation as a unit to provide for a 1:1 or direct drive ratio.

Reverse is obtained by engaging only the reverse clutch 40 so that the ring gear 34 of the rear gear set is held from rotation. With forward drive into the small sun gear 16, the carrier assembly of the rear gear set will be driven in a reverse direction at a speed reducing ratio.

For engine braking such as might be used in descending steep grades the brake band 104 is engaged to hold the drum 84 and the outer clutch 96 is applied by the operation of piston 80. This action holds the sun gear 36 for reaction and there will be a back drive from the output shaft 32 through the planetary gear set to the torque transmitting shaft 14. This reversal of power flow continues through the torque converter and back to the engine which when operating under low power conditions provides engine braking.

In neutral all brakes and clutches are released so that power cannot be transmitted through the planetary system.

Although a preferred embodiment of this invention has been shown and described other modifications and changes are now apparent to those skilled in the art. This invention is therefore not limited to that which has been shown and described for illustrating the invention but only by the following claims:

I claim:

1. A power transmission having input and output means, first and second planetary gear units operatively disposed in said transmission connecting said input means to said output means, each of said gear units comprising sun and ring gear means operatively connected by planet gear means and a carrier for said planet gear means, a clutching unit operatively disposed in said transmission, said clutching unit comprising a drum, support means operatively disposed within said transmission for supporting said drum for rotation therein, said drum having concentric first and second clutches operatively mounted therein, first motor means operatively mounted in said drum for engaging a first of said clutches, one-way brake means operatively connected to said first and second planetary gear units providing a one-way driving connection between said planetary gear units and said drum, said one-way brake means having an outer race operatively connected to said drum and to said first of said clutches and an inner race operatively connected to said carrier means of said first planetary gear unit and to said sun gear of said second planetary gear unit, selectively engageable brake means operatively disposed in said transmission radially outwardly from said drum and directly engageable therewith to hold said drum from rotation so that said one-way brake can automatically engage to condition said second planetary gear unit means for a low speed drive and so that said first clutch can be subsequently engaged by said first motor means to condition said second gear unit for a reduction ratio drive so that said gear units shift off of said one-way brake into an intermediate speed drive, and second motor means for housing said first motor means and for engaging said second clutch to condition said gear unit for direct drive when said first clutch is also engaged and said brake means is moved from engagement with said drum.

2. A power transmission comprising input and output means, planetary gear unit means operatively connecting said input means to said output means, said planetary gear unit means comprising first and second operatively connected planetary gear sets, a clutch unit operatively disposed in said transmission, said clutch unit having an annular drum with an interior and axially-extending sleeve portion, support means fitting within said interior sleeve portion for supporting said drum for rotation in said transmission, first and second separate clutch means operatively disposed in said drum, first motor means movably mounted in said drum for effecting the engagement of a first of said clutch means, one-way brake means providing a one-way driving connection between said planetary gear unit means and said drum, said one-way brake means having an outer race drivingly connected to said sleeve portion and an inner race operatively connected to said first planetary gear set, selectively-engageable brake means disposed externally of said drum and operatively engageable therewith to hold said drum from rotation so that said one-way brake means can automatically engage and condition said gear unit for a low speed drive and so that said first clutch means can be subsequently engaged to condition said gear unit for a shift off of said one-way brake means into an intermediate speed drive, and second motor means disposed within said drum for housing said first motor means and for engaging said second clutch means to condition said gear unit for direct drive when said clutch means is also engaged and said brake means is moved from braking engagement with said drum.

3. A power transmission having input and output means, planetary gear unit means operatively connecting said input means to said output means, a clutching unit operatively disposed in said transmission, said clutching unit comprising a rotatable drum, concentrically disposed first and second selectively-engageable clutches housed within said rotatable drum, first motor means for said first clutch, first brake means operatively disposed adjacent to said drum and selectively engageable with said drum to hold said drum from rotation, one-way brake means operatively connecting said drum directly to said gear unit means for automatically conditioning said gear unit means for low range drive when said first brake means is engaged with said drum and for overrunning in response to the engagement of said first clutch to condition said gear unit means for an intermediate speed ratio, said one-way brake means having an outer race supporting said first clutch in said housing concentric with said second clutch and said drum having a second motor means for housing said first motor means and for engaging said second clutch to condition said gear unit means for a direct drive ratio when said first clutch is engaged and when said first brake means is released and further to condition said gear unit means for a back drive from said output means to said input means when only said second clutch and said first brake are engaged.

4. The power transmission defined in claim 3, said one-way brake means having rotatable inner and outer races and having one-way connector means for drivingly connecting said races together only subsequent to the relative rotation of said races in a first direction, said planetary gear unit means having first and second planetary gear sets, one of said planetary gear sets having a carrier assembly operatively connected to a sun gear of the other of said planetary gear sets, first connecting means drivingly connecting said outer race to said drum, and second connecting means drivingly connecting said inner race to said carrier assembly and thereby to said sun gear.

* * * * *